(12) United States Patent
Yukikata et al.

(10) Patent No.: US 11,806,818 B2
(45) Date of Patent: Nov. 7, 2023

(54) FLUX AND SOLDER PASTE

(71) Applicant: KOKI Company Limited, Tokyo (JP)

(72) Inventors: Kazuhiro Yukikata, Tokyo (JP); Takefumi Arai, Tokyo (JP); Masashige Hayakawa, Tokyo (JP)

(73) Assignee: KOKI Company Limited, Tokyo (JP)

( * ) Notice: Subject to any disclaimer, the term of this patent is extended or adjusted under 35 U.S.C. 154(b) by 97 days.

(21) Appl. No.: 17/615,644

(22) PCT Filed: Jun. 26, 2020

(86) PCT No.: PCT/JP2020/025289
§ 371 (c)(1),
(2) Date: Dec. 1, 2021

(87) PCT Pub. No.: WO2020/262632
PCT Pub. Date: Dec. 30, 2020

(65) Prior Publication Data
US 2022/0266397 A1    Aug. 25, 2022

(30) Foreign Application Priority Data
Jun. 27, 2019 (JP) .................. 2019-120024

(51) Int. Cl.
*B23K 35/362* (2006.01)
*B23K 35/36* (2006.01)
*B23K 35/02* (2006.01)

(52) U.S. Cl.
CPC ........ *B23K 35/362* (2013.01); *B23K 35/3613* (2013.01); *B23K 35/025* (2013.01)

(58) Field of Classification Search
CPC .................................................. B23K 35/362
See application file for complete search history.

(56) References Cited

U.S. PATENT DOCUMENTS

| | | | |
|---|---|---|---|
| 2004/0069974 A1 | 4/2004 | Taguchi et al. | |
| 2013/0343023 A1 | 12/2013 | Nakagoshi et al. | |
| 2015/0217409 A1 | 8/2015 | Akagawa et al. | |
| 2020/0269362 A1* | 8/2020 | Uchida | B23K 35/3616 |
| 2020/0325326 A1 | 10/2020 | Yahagi et al. | |
| 2021/0060715 A1 | 3/2021 | Hashimoto et al. | |

FOREIGN PATENT DOCUMENTS

| | | | | |
|---|---|---|---|---|
| CN | 103515343 | | 1/2014 | |
| CN | 105397343 | | 3/2016 | |
| CN | 108555475 A | * | 9/2018 | |
| EP | 3150326 | | 4/2017 | |
| JP | 2002-146159 | | 5/2002 | |
| JP | 2012-241178 | | 12/2012 | |
| JP | 2014-144473 | | 8/2014 | |
| JP | 2017-064784 | | 4/2017 | |
| JP | 2018-047488 | | 3/2018 | |
| JP | 2019-013926 | | 1/2019 | |
| JP | 2021-045774 | | 3/2021 | |
| KR | 2019-0015467 | | 2/2019 | |
| TW | 201546301 | | 12/2015 | |
| TW | 201906812 | | 2/2019 | |
| WO | 2002/043916 | | 6/2002 | |
| WO | 2019/009097 | | 1/2019 | |
| WO | WO-2019009097 A1 | * | 1/2019 | ........ B23K 35/262 |
| WO | WO-2019074006 A1 | * | 4/2019 | ........ B23K 35/025 |
| WO | 2019/098053 | | 5/2019 | |
| WO | 2019/142826 | | 7/2019 | |

OTHER PUBLICATIONS

Japan Electronics and Information Technology Industries Association, JEITA ET-7304A Definition of Halogen-Free Soldering Materials (Year: 2010).*

* cited by examiner

*Primary Examiner* — Jophy S. Koshy
(74) *Attorney, Agent, or Firm* — Clark & Brody LP

(57) ABSTRACT

A flux according to the present invention is a halogen-free flux used for soldering that includes: a thixotropic agent a polyamide compound in which one endothermic peak or all of endothermic peaks obtained by differential thermal analysis are observed within a range of 130 to 200° C.; and an activator comprising an isocyanuric acid derivative, in which a content of the isocyanuric acid derivative is 5.0 mass % or less based on the entire flux.

4 Claims, No Drawings

FLUX AND SOLDER PASTE

CROSS-REFERENCE TO RELATED APPLICATION

This application claims priority to Japanese Patent Application No. 2019-120024, the disclosure of which is incorporated herein by reference in its entirety.

FIELD

The present invention relates to a flux used for soldering, and a solder paste including the flux.

BACKGROUND

A solder paste in which a solder alloy and a flux are mixed together is used in a mounting technology for mounting an electronic component such as a chip part or a package substrate on an electronic circuit board such as a printed wiring board. Specifically, a solder paste is screen-printed on a pad of the electronic circuit board surface, and thereafter the electronic component is mounted thereon and heated (reflowed) to thereby join the electronic component onto the electronic circuit board.

In recent years, miniaturization of electronic components in association with the downsizing and improved performance of electric devices has caused a tendency of narrowing a pad pitch on the electronic circuit board surface on which the solder paste is printed. For example, Patent Literature 1 discloses a solder paste using a fatty acid ester of sugar as a thixotropic agent included in a flux, as a technique to improve a solder meltability to such a miniaturized pad. Patent Literature 2 discloses a solder paste using an aromatic carboxylic acid having a hydroxyl group or an acyl group at an ortho position or a pros position, as an activator included in a flux.

CITATION LIST

Patent Literature

Patent Literature 1: JP 2014-144473 A
Patent Literature 2: JP 2017.64784 A

SUMMARY

Technical Problem

Conventionally, a halogen, which causes an oxide film to be removed from a solder surface to thereby decrease the surface tension of a solder, has been widely used as an activator for improving a solder meltability. A halogen compound is also included as an activator in a solder paste of each of Patent Literatures 1 and 2 below. However, since the halogen compound when burned may generate harmful substances such as dioxine, attempts for developing a halogen-free solder paste have been made in recent years. Therefore, there is a demand for development of a halogen-free solder paste having an excellent solder meltability to a miniaturized pad.

The present invention has been conceived in view of the above circumstances, and it is an object of the present invention to provide a halogen-free flux having an excellent solder meltability to a miniaturized pad, and a solder paste including the flux.

Solution to Problem

The flux according to the present invention is a halogen-free flux used for soldering, the flux including: a thixotropic agent including a polyamide compound in which one endothermic peak or all of endothermic peaks obtained by differential thermal analysis are observed within a range of 130 to 200° C.; and an activator including an isocyanuric acid derivative in which a content of the isocyanuric acid derivative is 5.0 mass % or less based on the entire flux.

In the flux according to the present invention, the content of the isocyanuric acid derivative is preferably 0.5 mass % or more and 5.0 mass % or less based on the entire flux.

In the flux according to the present invention, the isocyanuric acid derivative is preferably at least one selected from bis(2-carboxyethyl)isocyanuric acid, tris(2-carboxyethyl)isocyanuric acid, and tris(2-carboxypropyl)isocyanuric acid.

In the flux according to the present invention, the content of the polyamide compound is preferably 1.0 mass % or more and 7.0 mass % or less based on the entire flux.

The solder paste according to the present invention includes the aforementioned flux and a solder alloy.

DESCRIPTION OF EMBODIMENTS

Hereinafter, a flux and a solder paste according to an embodiment of the present invention will be described.

Flux

Thixotropic Agent

The flux according to this embodiment includes, as a thixotropic agent, a polyamide compound in which one endothermic peak or all of endothermic peaks obtained by differential thermal analysis are observed within a range of 130 to 200° C. The endothermic peak herein means a peak at which an endothermic amount is 10 J/g or more. The endothermic peak is an index showing a state change of the thixotropic agent. The thixotropic agent is assumed to change its state from a solid state to a liquid state or glass state at a temperature at which the endothermic peaks are observed. Thus, it can be assumed that the polyamide compound as the thixotropic agent in which all of the endothermic peaks are observed within a range of 130 to 200° C., that is, the thixotropic agent changes its state within this temperature range would not prevent a solder alloy from wetting and spreading.

The differential thermal analysis can be performed, for example, in the following conditions using a differential scanning calorimeter (Thermo plus DSC 8230 manufactured by Rigaku Corporation).

Measuring temperature range: 30 to 300° C.
Heating rate: 10° C./min
Measuring environment: Nitrogen atmosphere at flow rate of 30 mL/min
Sample amount: 10 mg Examples of the polyamide compound include an aromatic polyamide compound (semiaromatic polyamide compound or wholly aromatic polyamide compound) having a cyclic compound such as a benzene ring or a naphthalene ring in the main chain and an aliphatic polyamide compound. Examples of the aromatic polyamide compound in which one endothermic peak or all of endothermic peaks obtained by differential thermal analysis are observed within a range of 130 to 200° C. include an aromatic polyamide compound by the product name of JH-180 (manufactured by Itoh Oil Chemicals Co., Ltd.). Examples of the aliphatic polyamide compound in which one endothermic peak or all of endothermic peaks obtained by differential thermal analysis are observed within a range of 130 to 200° C. include an aliphatic polyamide compounds by the product names of VA‾79 (manufactured by Kyoeisha Chemical Co., Ltd.), AMX-6096A (manufactured by Kyoeisha Chemical Co., Ltd.), SP-10, SP-500 (each manufactured by Toray Industries, Inc.), Grilamid L 20G, and Grilamid TR 55 (each manufactured by EMS-CHEMIE (Japan) Ltd.). These polyamide compounds can be individually used, or two or more of them can be used in combination.

The content of the polyamide compound is preferably 1.0 mass % or more, more preferably 3.0 mass % or more based on the entire flux. The content of the polyamide compound is preferably 7.0 mass % or less, more preferably 5.0 mass % or more based on the entire flux. When two or more different polyamide compounds are included, the aforementioned content means the total content of the polyamide compounds.

The flux according to this embodiment can include another thixotropic agent different from the polyamide compounds. The other thixotropic agent is not particularly limited, and examples thereof include a bisamide compound, a hardened castor oil, kaolin, a colloidal silica, an organic bentonite, and a glass frit. These can be individually used, or two or more of them can be used in combination. The content of the other thixotropic agent is preferably 80 mass % or less, more preferably 40 mass % or less based on the entire thixotropic agents, and it is still more preferable that the other thixotropic agent be not included.

Activator

The flux according to this embodiment further includes isocyanuric acid derivative as an activator. The isocyanuric acid derivative herein means a compound having an isocyanuric skeleton shown in formula (1) below.

Formula 1

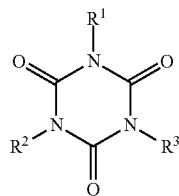

(1)

where $R^1$, $R^2$, and $R^3$ are the same as or different from each other and represent a hydrogen atom, a carboxyl group, a 1-8C alkyl group, an organic group represented by —Y—X (where Y represents a 1-6C alkylene group, phenylene group, or cycloalkylene group, and X represents an organic group including a carboxyl group, a hydroxyl group, an amino group, a phenyl group, or a phosphorus atom).

The isocyanuric acid derivative is preferably at least one selected from bis(2-carboxyethyl) isocyanuric acid (i.e., where $R^1$ in formula (1) represents a hydrogen atom, $R^2$ and $R^3$ are the same organic group represented by —Y—X, Y is an ethylene group and X is a carboxyl group), tris(2-carboxyethyl) isocyanuric acid (i.e., where $R^1$, $R^2$, and $R^3$ in formula (1) are the same organic group represented by —Y—X, Y is an ethylene group and X is a carboxyl group), and tris(2-carboxypropyl) isocyanuric acid (i.e., where $R^1$, $R^2$, and $R^3$ in formula (1) are the same organic group represented by —Y—X, Y is a propylene group and X is a carboxyl group).

The content of the isocyanuric acid derivative is 5.0 mass % or less, preferably 3.0 mass % or less, more preferably 2.5 mass % or less based on the entire flux. The content of the isocyanuric acid derivative is preferably 0.5 mass % or more, more preferably 1.0 mass % or more based on the entire flux. When two or more different isocyanuric acid derivatives are included, the aforementioned content means the total content of the isocyanuric acid derivatives.

The flux according to this embodiment can include another activator different from the isocyanuric acid derivatives. The other activator is not particularly limited, and examples thereof include an organic acid-based activator, an amine compound, and an amino acid compound.

The organic acid-based activator is not particularly limited, and examples thereof include: a monocarboxylic acid such as formic acid, acetic acid, propionic acid, butyric acid, valeric acid, caproic acid, enanthic acid, capric acid, lauric acid, myristic acid, pentadecyl acid, palmitic acid, margaric acid, stearic acid, tuberculostearic acid, arachidic acid, behenic acid, lignoceric acid, and glycolic acid; a dicarboxylic acid such as oxalic acid, malonic acid, succinic acid, methylsuccinic acid, glutaric acid, adipic acid, pimeric acid, suberic acid, azelaic acid, sebacic acid, fumaric acid, maleic acid, tartaric acid, and diglycolic acid; and other organic acids such as dimer acid, levulinic acid, lactic acid, acrylic acid, benzoic acid, salicylic acid, anisic acid, citric acid, and picolinic acid.

The amine compound is not particularly limited, and examples thereof include tetraacetylethylenediamine (N,N,N',N'-tetraacetylethylenediamine), N-acetylimidazole, N-acetylphthalimide, acetamidobenzoic acid (3-acetamidobenzoic acid and 4-acetamidobenzoic acid), N-acetylanthranilic acid, and acetamide nitrobenzoic acid (2-acetamide-6-nitrobenzoic acid, 3-acetamide-4-nitrobenzoic acid, 3-acetamide-2-nitrobenzoic acid, and 5-acetamide-2-nitrobenzoic acid).

The amino acid compound is not particularly limited, and examples thereof include N-acetylphenylalanine (N-acetyl-L-phenylalanine, N-acetyl-DL-phenylalanine, and N-acetyl-D-phenylalanine), N-acetylglutamic acid (N-acetyl-L-glutamic acid), N-acetylglycine, N-acetylleucine (N-acetyl-L-leucine, N-acetyl-DL-leucine, and N-acetyl-D-leucine), and N-acetylphenylglycine (N-acetyl-N-phenylglycine, N-acetyl-L-phenylglycine, and N-acetyl-DL-phenylglycine).

These other activators can be individually used, or two or more of them can be used in combination. The content of the other activators is preferably 15 mass % or less, more preferably 10 mass % or less based on the entire flux.

The flux according to this embodiment is a halogen-free flux in terms of environmental load. The halogen-free flux herein means a flux in which the content of each of halogen elements (F: fluorine, Cl: chlorine, Br: bromine, I: iodine) is 1000 ppm or less (JEITA ET-7304A). The flux according to this embodiment can be a flux even including a halogen-based activator such as an amine halogen salt and a halogen compound as long as it meets the aforementioned conditions for the halogen-free flux. Examples of the amine of the amine halogen salt include diethylamine, dibutylamine, tributylamine, diphenylguanidine, and cyclohexylamine. Examples of the halogen of the amine halogen salt include fluorine, chlorine, bromine, and iodine. Examples of the halogen compound include isocyanuric acid tris(2,3-dibromopropyl), 2,3-dibromo-2-butene-1,4-diol, 2-bromo-3-iodine-2-butene-1,4-diol, TBA-bis(2,3-dibromopropyl ether).

Solvent

The flux according to this embodiment can include a solvent. The solvent is not particularly limited and a known solvent can be used. Examples of the solvent include: glycol ethers such as diethylene glycol monohexyl ether (hexyl diglycol), diethylene glycol dibutyl ether (dibutyl diglycol), diethylene glycol mono 2-ethylhexyl ether (2 ethylhexyl diglycol), diethylene glycol monobutyl ether (butyl diglycol), and triethylene glycol monobutyl ether (butyl triglycol); aliphatic compounds such as n-hexane, isohexane, and n-heptane; esters such as isopropyl acetate, methyl propionate, and ethyl propionate; ketones such as methyl ethyl ketone, methyl-n-propyl ketone, and diethyl ketone; and alcohols such as ethanol, n-propanol, isopropanol, and isobutanol. The solvents can be individually used, or two or more of them can be used in combination.

The content of the solvent is not particularly limited, and is, for example, preferably 10.0 mass % or more, more preferably 20.0 mass % or more based on the entire flux. The content of the solvent is preferably 60.0 mass % or less, more preferably 45.0 mass % or less based on the entire flux. When two or more different solvents are included, the aforementioned content means the total content of the solvents.

Resin

The flux according to this embodiment further include a resin. Examples of the resin include a rosin-based resin and a synthetic resin. The rosin-based resin is not particularly limited, and, for example, at least one or more rosin-based resins selected from a rosin and a rosin derivative (for example, a hydrogenated rosin, a polymerized rosin, a disproportionated rosin, and an acrylic acid modified rosin) can be used. The synthetic resin is not particularly limited, and a known synthetic resin such as a terpene phenol resin can be used. These resins can be individually used, or two or more of them can be used in combination.

The content of the resin is preferably 30 mass % or more, more preferably 40 mass % or more based on the entire flux. The content of the resin is preferably 70 mass % or less, more preferably 50 mass % or less based on the entire flux. When two or more of the resins are included, the aforementioned content means the total content of the resins.

The flux according to this embodiment can include, for example, at least one selected from a stabilizer, a surfactant, a defoamer, and a corrosion inhibitor, as other additives. The content of the other additives is not particularly limited, and can be, for example, 5.0 mass % or less based on the entire flux.

The flux according to this embodiment is a halogen-free flux used for soldering, the flux including: a thixotropic agent including a polyamide compound in which one endothermic peak or all of endothermic peaks obtained by differential thermal analysis are observed within a range of 130 to 200° C.; and an activator including an isocyanuric acid derivative in which a content of the isocyanuric acid derivative is 5.0 mass % or less based on the entire flux. This configuration enables the flux when used along with a solder alloy to have an excellent solder meltability to a miniaturized pad.

In the flux according to this embodiment, it is preferable that the content of the isocyanuric acid derivative be 0.5 mass % or more and 5.0 mass % or less based on the entire flux. This configuration enables flux when used along with a solder alloy to have an improved solder meltability to a miniaturized pad.

In the flux according to this embodiment, it is preferable that the isocyanuric acid derivative be at least one selected from bis(2-carboxyethyl)isocyanuric acid, tris(2-carboxyethyl)isocyanuric acid, and tris(2-carboxypropyl)isocyanuric acid. This configuration enables the flux when used along with a solder alloy to have an improved solder meltability to a miniaturized pad.

In the flux according to this embodiment, it is preferable that the content of the polyamide compound be 1.0 mass % or more and 7.0 mass % or less based on the entire flux. This configuration enables the flux when used along with a solder alloy to have an improved solder meltability to a miniaturized pad.

The flux according to this embodiment can be obtained by, for example, putting a thixotropic agent and an activator, and further a solvent, a resin and other additives as needed into a heating container, followed by heating these materials to 160 to 180° C. to thereby melt all of them, and finally cooling them to room temperature.

The flux according to this embodiment includes a thixotropic agent, an activator, a solvent, a resin, and other additives but is not limited to this configuration. The flux according to another embodiment is formed of a thixotropic agent, an activator, a solvent, a resin, and other additives.

Solder Paste

The solder paste according to this embodiment includes the aforementioned flux and a solder alloy. More specifically, the solder paste is obtained by mixing solder alloy powder with the flux. The content of the flux is preferably 5 to 20 mass % based on the entire solder paste. The content of the solder alloy powder is preferably 80 to 95 mass % based on the entire solder paste.

The size of the solder alloy powder is not particularly limited, but is preferably equal to or more than code 4 set forth in JIS Z 3284-1, namely, 50 µm or less, more preferably equal to or more than code 6, namely, 25 µm or less, in order to produce a good printing performance to a miniaturized pattern.

Examples of the solder alloy include a lead-free solder alloy and a eutectic solder alloy including lead. In terms of reducing the environmental load, a lead-free solder alloy is preferable. Examples of the lead-free solder alloy include an alloy including tin, silver, copper, indium, zinc, bismuth, antimony, and the like. In particular, the solder alloy is preferably a medium melting temperature type, a medium high melting temperature type, or a high melting temperature type lead-free solder alloy set forth in JIS Z 3282:2017 (ISO9453) in terms of improving the solder meltability to a miniaturized pad. Specifically, examples of such an alloy include an alloy of Sn/Ag, Sn/Ag/Cu, Sn/Cu, Sn/Ag/Bi, Sn/Ag/Cu/Bi, Sn/Sb, Sn/Ag/Bi/In, or Sn/Ag/Cu/Bi/In/Sb.

The solder paste according to this embodiment includes the aforementioned flux and a solder alloy to thereby have an excellent solder meltability to a miniaturized pad.

EXAMPLES

Hereinafter, examples of the present invention will be described. However, the present invention is not limited to the following examples.

Preparation of Solder Paste

A rosin, a thixotropic agent, and a solvent in the mixing amounts shown in Table 1 were put into a heating container and heated to 180° C. to obtain a varnish component. Then, the varnish component and the other components were mixed at room temperature to obtain uniformly dispersed fluxes. The mixing amounts shown in Table 1 are respectively equal to the contents of the corresponding components included in each flux. Next, mixing was made to have 13.0 mass % of each flux and 87.0 mass % of solder powder (Sn—3.0 wt % of Ag—0.5 wt % of Cu, size: 10 to 25 μm) to obtain a solder paste of each of Examples and each of Comparative Examples.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Mixing amounts of flux (mass %) | Resin | KE-604 | 48.2 | 49.1 | 48.9 | 48.2 | 47.1 | 48.2 | 46.6 | 48.2 | 48.2 | 48.2 | 38.6 |
| | Resin | S-145 | — | — | — | — | — | — | — | — | — | — | 9.6 |
| | Thixotropic agent | JH-180 | 3.4 | 3.4 | 3.4 | 3.4 | 3.3 | 3.4 | 6.5 | — | — | 3.4 | 3.4 |
| | | VA-79 | — | — | — | — | — | — | — | 3.4 | — | — | — |
| | | AMX-6096A | — | — | — | — | — | — | — | — | 3.4 | — | — |
| | | WH-255 | — | — | — | — | — | — | — | — | — | — | — |
| | Solvent | BTG | 38.6 | 39.3 | 39.1 | 38.6 | 37.6 | 38.6 | 37.3 | 38.6 | 38.6 | — | 38.6 |
| | | HeDG | — | — | — | — | — | — | — | — | — | 38.6 | — |
| | Organic acid-based Activator | Adipic acid | 1.4 | 1.5 | 1.5 | 1.4 | 1.4 | 1.4 | 1.4 | 1.4 | 1.4 | 1.4 | 1.4 |
| | | Sebacic acid | 1.4 | 1.5 | 1.5 | 1.4 | 1.4 | 1.4 | 1.4 | 1.4 | 1.4 | 1.4 | 1.4 |
| | | Methylsuccinic acid | 1.0 | 1.0 | 1.0 | 1.0 | 0.9 | 1.0 | 0.9 | 1.0 | 1.0 | 1.0 | 1.0 |
| | | Succinic acid | 2.4 | 2.5 | 2.4 | 2.4 | 2.4 | 2.4 | 2.3 | 2.4 | 2.4 | 2.4 | 2.4 |
| | | Bis(2-carboxyethyl)isocyanuric acid | 2.4 | — | — | — | — | — | — | — | — | — | — |
| | | Tris(2-carboxyethyl)isocyanuric acid | — | 0.5 | 1.0 | 2.4 | 4.7 | — | 2.3 | 2.4 | 2.4 | 2.4 | 2.4 |
| | | Tris(2-carboxypropyl)isocyanuric acid | — | — | — | — | — | 2.4 | — | — | — | — | — |
| | Amino acid | N-acetyl-L-glutamic acid | — | — | — | — | — | — | — | — | — | — | — |
| | Stabilizer | 2,2'-methylenebis(6-tert-butyl-4-methylphenol) | 1.2 | 1.2 | 1.2 | 1.2 | 1.2 | 1.2 | 1.2 | 1.2 | 1.2 | 1.2 | 1.2 |
| <Meltability tetst> Ratio of the number of pads falling under each of conditions | | ○: Solder was molten (with gloss) | 62 | 62 | 86 | 98 | 60 | 86 | 84 | 86 | 92 | 60 | 64 |
| | | Δ: Solder particles were partially unmolten | 38 | 38 | 14 | 2 | 40 | 14 | 16 | 14 | 8 | 40 | 36 |
| | | ×: Solder was not molten (without gloss) | 0 | 0 | 0 | 0 | 0 | 0 | 0 | 0 | 0 | 0 | 0 |

| | | | Comparative Example | | | |
|---|---|---|---|---|---|---|
| | | | 1 | 2 | 3 | 4 |
| Mixing amounts of flux (mass %) | Resin | KE-604 | 48.9 | 48.9 | 48.2 | 45.4 |
| | Resin | S-145 | — | — | — | — |
| | Thixotropic agent | JH-180 | 3.4 | 3.4 | — | 3.2 |
| | | VA-79 | — | — | — | — |
| | | AMX-6096A | — | — | — | — |
| | | WH-255 | — | — | 3.4 | — |
| | Solvent | BTG | 39.1 | 39.1 | 38.6 | 36.3 |
| | | HeDG | — | — | — | — |
| | Organic acid-based Activator | Adipic acid | 1.5 | 1.5 | 1.4 | 1.4 |
| | | Sebacic acid | 1.5 | 1.5 | 1.4 | 1.4 |
| | | Methylsuccinic acid | 1.0 | 1.0 | 1.0 | 0.9 |
| | | Succinic acid | 3.4 | 2.4 | 2.4 | 2.3 |
| | | Bis(2-carboxyethyl)isocyanuric acid | — | — | — | — |
| | | Tris(2-carboxyethyl)isocyanuric acid | — | — | 2.4 | 8.2 |
| | | Tris(2-carboxypropyl)isocyanuric acid | — | — | — | — |
| | Amino acid | N-acetyl-L-glutamic acid | — | 1.0 | — | — |
| | Stabilizer | 2,2'-methylenebis(6-tert-butyl-4-methylphenol) | 1.2 | 1.2 | 1.2 | 1.1 |
| <Meltability tetst> Ratio of the number of pads falling under each of conditions | | ○: Solder was molten (with gloss) | 26 | 30 | 0 | 8 |
| | | Δ: Solder particles were partially unmolten | 74 | 70 | 14 | 92 |
| | | ×: Solder was not molten (without gloss) | 0 | 0 | 86 | 0 |

Details of each of the raw materials shown in Table 1 are described below.

KE-604: Acrylic acid modified rosin manufactured by Arakawa Chemical Industries, Ltd.

S-145: Terpene phenol resin manufactured by YASU-HARA CHEMICAL CO., LTD.

JH-180: Semiaromatic polyamide compound manufactured by Itoh Oil Chemicals Co., Ltd.

VA-79: Aliphatic polyamide compound manufactured by Kyoeisha Chemical Co., Ltd.

AMX-6096A: Aliphatic polyamide compound manufactured by Kyoeisha Chemical Co., Ltd.

WH-255: Aliphatic polyamide compound manufactured by Kyoeisha Chemical Co., Ltd.

BTG: Butyl triglycol manufactured by NIPPON NYUKAZAI CO., LTD.

HeDG: Hexyl diglycol manufactured by NIPPON NYUKAZAI CO., LTD.

Adipic acid: Manufactured by Tokyo Chemical Industry Co., Ltd.

Sebacic acid: Manufactured by Tokyo Chemical Industry Co., Ltd.

Methylsuccinic acid: Manufactured by Tokyo Chemical Industry Co., Ltd.

Succinic acid: Manufactured by Tokyo Chemical Industry Co., Ltd.

Bis(2-carboxyethyl)isocyanuric acid: Manufactured by Tokyo Chemical Industry Co., Ltd.

Tris(2-carboxyethyl)isocyanuric acid: Manufactured by Tokyo Chemical Industry Co., Ltd.

Tris(2-carboxypropyl)isocyanuric acid: Manufactured by Tokyo Chemical Industry Co., Ltd.

N-acetyl-L-glutamic acid: Manufactured by Tokyo Chemical Industry Co., Ltd.

2,2'-methylenebis(6-tert-butyl-4-methylphenol): Manufactured by Tokyo Chemical Industry Co., Ltd.

Measurement of Endothermic Peak Temperature

The endothermic peak temperature of each of the thixotropic agents was measured by differential thermal analysis. Specifically, the differential thermal analysis was performed in the following conditions using a differential scanning calorimeter (Thermo plus DSC 8230 manufactured by Rigaku Corporation). Table 2 shows the endothermic peak temperatures at each of which the endothermic amount obtained by differential thermal analysis was 10 J/g or more.

Measuring temperature range: 30 to 300° C.
Heating rate: 10° C./min
Measuring environment: Nitrogen atmosphere at flow rate of 30 mL/min
Sample amount: 10 mg

TABLE 2

| Thixotropic agent | Endothermic peak temperature (° C.) | Endothermic amount (J/g) |
|---|---|---|
| JH-180 | 191.3 | 31.2 |
| VA-79 | 133.7 | 34.0 |
|  | 166.6 | 14.7 |
|  | 193.2 | 13.4 |
| AMX-6096A | 136.4 | 31.1 |
|  | 170.1 | 10.1 |
|  | 197.6 | 12.9 |
| WH-255 | 71.4 | 13.6 |
|  | 142.3 | 32.5 |
|  | 245.2 | 17.8 |

As can be seen from the results shown in Table 2, JH-180 is a polyamide compound in which one endothermic peak obtained by differential thermal analysis is observed within a range of 130 to 200° C. VA-79 and AMX-6096A each are a polyamide compound in which three endothermic peaks obtained by differential thermal analysis are observed within a range of 130 to 200° C. Thus, JH-180, VA-79, and AMX-6096A are thixotropic agents that satisfy the requirements of the present invention. On the other hand, WH-255 is a polyamide compound in which two endothermic peaks among three endothermic peaks obtained by differential thermal analysis are observed out of a range of 130 to 200° C. Thus, WH-255 is a thixotropic agent that does not satisfy the requirements of the present invention.

Evaluation of Solder Meltability

The solder paste of each of Examples and each of Comparative Examples was applied at a thickness of 80 μm to a copper pad (with a square shape of 0.2 mm×0.2 mm) on a substrate surface having a size of 100 mm×100 mm and a thickness of 1.0 mm. Next, the substrate including the copper pad on the substrate surface was heated in the following temperature conditions to melt the solder. The heating was performed in the order of (i) to (ii).

Temperature Conditions (i) At the time of preheating
Heating rate: 1.0 to 3.0° C./sec
Preheating temperature: 150 to 190° C./60 to 100 sec
Heating environment: Atmosphere
(ii) At the time of solder melting
Heating rate: 1.0 to 2.0° C./sec
Melting temperature: 219° C. or more for 30 sec or more
Peak temperature: 230 to 250° C.

The evaluation of the solder meltability was performed by visual observation based on the following conditions. Table 1 shows the ratio of the number of pads falling under each of the conditions to all the pads (50 pads).

◯: Solder was molten. (with gloss)
Δ: Solder particles were partially unmolten.
x: Solder was not molten. (without gloss)

As can be seen from the results shown in Table 1, the solder paste according to each of Examples meeting all the requirements of the present invention has an excellent solder meltability to a miniaturized pad since the number of pads in which solder was molten was 60% or more.

On the other hand, it can be found that the solder paste according to each of Comparative Examples 1 and 2 not including the isocyanuric acid derivative as an activator is inferior in solder meltability to a miniaturized pad since the number of pads in which solder was molten was less than 60% and the solder particles was partially unmolten in many pads. Further, it can be found that the solder paste according to Comparative Example 3 including, as a thixotropic agent, the polyamide compound in which some of the endothermic peaks obtained by differential thermal analysis were also observed out of a range of 130 to 200° C. is inferior in solder meltability to a miniaturized pad since solder was not molten in many pads. Furthermore, it can be found that the solder paste according to Comparative Example 4 including the isocyanuric acid derivative at a content of more than 5.0 mass % based on the entire flux is inferior in solder meltability to a miniaturized pad since the solder particles were partially unmolten in many pads.

The invention claimed is:
1. A halogen-free flux used for soldering, the flux comprising:
a thixotropic agent consisting of a polyamide compound in which all endothermic peaks obtained by differential thermal analysis are observed within a range of 130 to 200° C.; and
an activator comprising an isocyanuric acid derivative, wherein a content of the isocyanuric acid derivative is 0.5 mass % or more and 5.0 mass % or less based on the entire flux.

2. The flux according to claim 1, wherein the isocyanuric acid derivative is at least one selected from bis(2-carboxyethyl)isocyanuric acid, tris(2-carboxyethyl)isocyanuric acid, and tris(2-carboxypropyl) isocyanuric acid.

3. The flux according to claim 1, wherein the content of the polyamide compound is 1.0 mass % or more and 7.0 mass % or less based on the entire flux.

4. A solder paste comprising:
the flux according to claim 1; and
a solder alloy.

* * * * *